US011565600B2

(12) United States Patent
Wright et al.

(10) Patent No.: US 11,565,600 B2
(45) Date of Patent: Jan. 31, 2023

(54) DEPLOYABLE CHARGING POINTS FOR VEHICLES

(71) Applicant: Ford Global Technologies, LLC, Dearborn, MI (US)

(72) Inventors: Ian Wright, Chelmsford (GB); Torsten Gerhardt, London (GB); Jack Wright, Chelmsford (GB)

(73) Assignee: Ford Global Technologies, LLC, Dearborn, MI (US)

( * ) Notice: Subject to any disclaimer, the term of this patent is extended or adjusted under 35 U.S.C. 154(b) by 167 days.

(21) Appl. No.: 16/952,190

(22) Filed: Nov. 19, 2020

(65) Prior Publication Data

US 2021/0162879 A1 Jun. 3, 2021

(30) Foreign Application Priority Data

Dec. 2, 2019 (GB) ..................................... 1917579

(51) Int. Cl.
*H02J 7/00* (2006.01)
*H02J 7/14* (2006.01)
*B60L 53/18* (2019.01)
*B60L 53/36* (2019.01)

(52) U.S. Cl.
CPC ............... *B60L 53/18* (2019.02); *B60L 53/36* (2019.02); *B60L 2240/62* (2013.01)

(58) Field of Classification Search
CPC .......... B60L 53/18; B60L 53/36; B60L 53/34; B60L 53/16
USPC ................................................. 320/104, 109
See application file for complete search history.

(56) References Cited

U.S. PATENT DOCUMENTS

| | | | | |
|---|---|---|---|---|
| 5,445,252 A | * | 8/1995 | McKee | B65H 75/425 191/12 C |
| 5,462,439 A | * | 10/1995 | Keith | B60L 53/305 439/246 |
| 8,890,475 B1 | * | 11/2014 | Becker | B60L 53/68 320/109 |
| 2011/0139521 A1 | * | 6/2011 | Ichikawa | B60L 53/18 903/903 |
| 2011/0300738 A1 | * | 12/2011 | Hengel | H01R 13/44 439/374 |
| 2012/0197470 A1 | * | 8/2012 | Inui | B62H 1/02 180/220 |

(Continued)

FOREIGN PATENT DOCUMENTS

| | | |
|---|---|---|
| CN | 105607666 | 5/2016 |
| DE | 102012203856 | 9/2013 |

(Continued)

*Primary Examiner* — Alexis B Pacheco
(74) *Attorney, Agent, or Firm* — David B. Kelley; Carlson, Gaskey & Olds, P.C.

(57) ABSTRACT

A deployable charging point assembly for a vehicle includes a connecting part for connecting to a supply of electrical power separate from the vehicle. The connecting part is mountable on the vehicle, such that the connecting part is movable relative to a body of the vehicle between a first position and a second position. The charging point assembly is configured to establish an electrical connection between the supply of electrical power and an electrical system of the vehicle when the connecting part is in one or more predetermined positions between the first and second positions.

16 Claims, 7 Drawing Sheets

(56) References Cited

U.S. PATENT DOCUMENTS

| | | | | |
|---|---|---|---|---|
| 2012/0228420 A1* | 9/2012 | Ichikawa | ................ | B60L 50/16 |
| | | | | 296/146.2 |
| 2012/0256589 A1* | 10/2012 | Ichikawa | ................ | B60L 53/11 |
| | | | | 320/111 |
| 2016/0280087 A1* | 9/2016 | Tajima | ..................... | B60L 5/40 |
| 2016/0325635 A1* | 11/2016 | Masuda | .................. | B60L 53/66 |
| 2018/0086212 A1* | 3/2018 | Dudar | .................. | H04B 5/0037 |
| 2021/0291692 A1* | 9/2021 | Masoud | ............... | H04B 5/0012 |

FOREIGN PATENT DOCUMENTS

| | | | | |
|---|---|---|---|---|
| DE | 102012214750 | 11/2013 | | |
| DE | 102014215668 | 2/2016 | | |
| DE | 102016012514 | 4/2018 | | |
| DE | 102016219991 | 4/2018 | | |
| WO | 2011054752 | 5/2011 | | |
| WO | WO-2011054752 A2 * | 5/2011 | .......... | B60L 11/1816 |
| WO | 2012041277 | 4/2012 | | |
| WO | 2017209735 | 12/2017 | | |
| WO | 2019025968 | 2/2019 | | |

\* cited by examiner

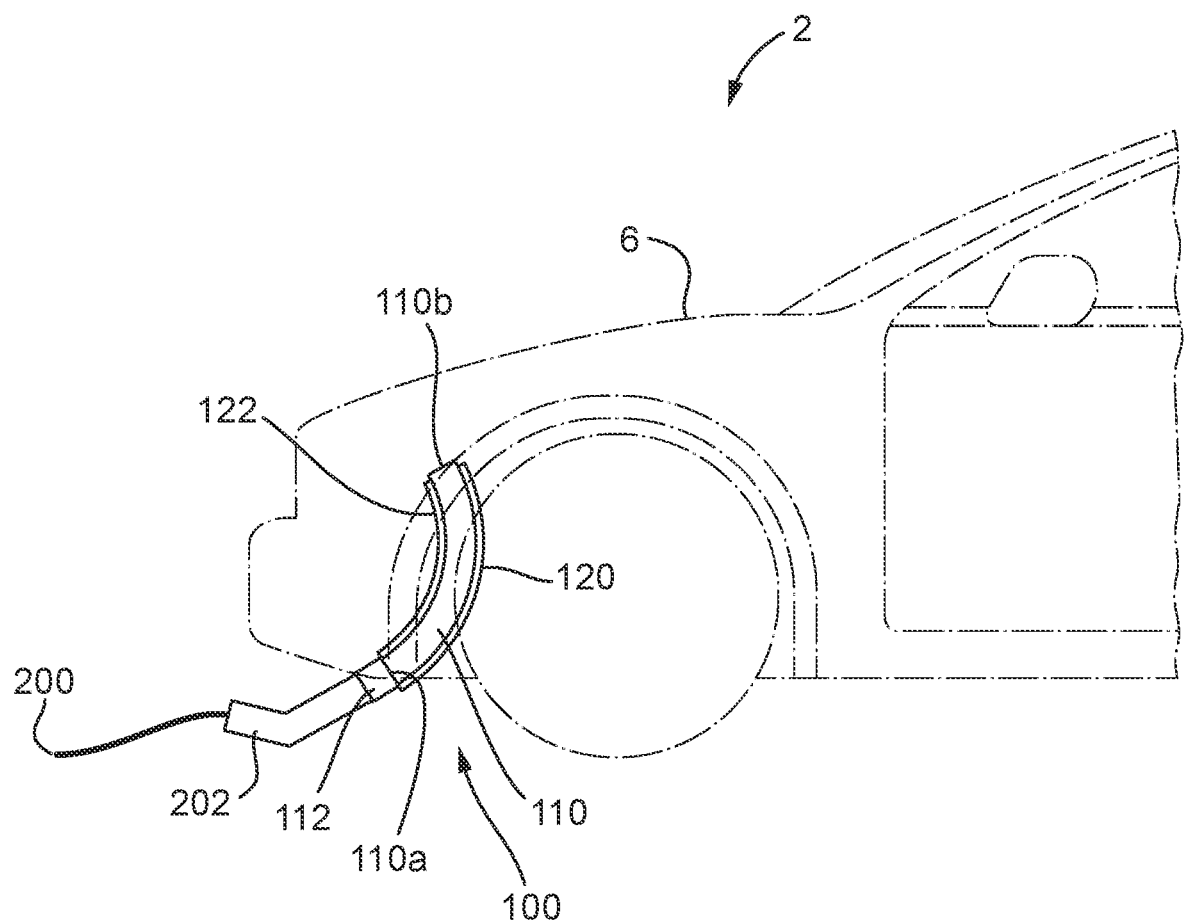

DEPLOYABLE CHARGING POINTS FOR VEHICLES

CROSS-REFERENCE TO RELATED APPLICATIONS

This application claims priority to GB Patent Application No. 1917579.3, which was filed on 2 Dec. 2019 and is incorporated herein by reference in its entirety.

TECHNICAL FIELD

The present disclosure relates to deployable charging points for vehicles.

BACKGROUND

Electrically powered vehicles, such as plug-in hybrid vehicles and electric vehicles, typically comprise a charge socket mounted on an exterior surface of the vehicle for connecting the vehicle to a supply of electrical power, such as an electricity grid, in order to charge batteries of the vehicle.

The charge socket is typically positioned at a location that is a compromise between ergonomics, e.g. being reachable by a user of the electric vehicle, and suitable structural points on a frame of the vehicle for mounting the charge socket.

The charge socket may be covered by a flap for protecting the charge socket from weather and debris that may otherwise settle on the charge socket and inhibit the operation of the charge socket. The flap may be opened during charging of the vehicle to provide access to the charge socket.

SUMMARY

According to an aspect of the present disclosure, there is provided a deployable charging point assembly for a vehicle, the assembly comprising a connecting part for connecting to a supply of electrical power separate from the vehicle, wherein the connecting part is mountable on the vehicle, such that at least a portion of the connecting part is movable relative to a body of the vehicle, e.g. in an outward, upward and/or downward direction relative to the vehicle body, between a first position and a second position, wherein the charging point assembly is configured to establish an electrical connection between the supply of electrical power and an electrical system of the vehicle when the connecting part is in one or more predetermined positions, e.g. between the first and second positions (inclusive of the first and second positions).

The first position may be a retracted position, in which the connecting part is recessed relative to an outer surface of the body of the vehicle. The second position may be a deployed position in which the connecting part is recessed less relative to the outer surface of the vehicle body than in the first position.

In the deployed position, the connecting part may at least partially protrude outwardly from the vehicle body, e.g. relative to an outer surface. In the retracted position, the connection part may protrude less from the outer surface of the vehicle body.

The connecting part may be substantially completely received within or beneath the vehicle body in the retracted position. The connecting part may be configured to couple to the supply of electrical power.

The charging point assembly may be configured to establish the electrical connection between the supply of electrical power and the vehicle electrical system when the connecting part is in either the deployed position, e.g. a fully deployed position, or the retracted position, e.g. a fully retracted position. In other words, the charging point assembly may be configured such that no electrical connection is established between the supply of electrical power and the vehicle electrical system when the charge point is at a position between the retracted and deployed positions, e.g. not in the retracted or deployed positions.

Alternatively, the charging point assembly may be configured to establish the electrical connection between the supply of electrical power and the vehicle when, e.g. only when, the charge point is in the retracted position, e.g. the fully retracted position.

Alternatively, again, the charging point assembly may be configured to establish the electrical connection between the supply of electrical power and the vehicle when, e.g. only when, the charge point is in the deployed position, e.g. the fully deployed position.

The assembly may comprise an attachment part mountable, e.g. fixedly mountable, on the vehicle, e.g. such that the position of the attachment part is fixed relative to the vehicle body. The connecting part may be movably mountable on the vehicle by the attachment part.

The connecting part may comprise an input terminal for electrically connecting to the supply of electrical power. The connecting part or the attachment part may comprise an output terminal connectable to the electrical system of the vehicle, e.g. via a cable extending between the output terminal and the electrical system. The input terminal may comprise a plug or socket shaped in order to be complementary to a plug or socket provided by the supply of electrical power.

The charging point assembly may be configured such that the input terminal is electrically connected to the output terminal when the connecting part is in one or more predetermined positions relative to the attachment part, e.g. when the connecting part is in the retracted position and/or when the connecting part is in the deployed position.

The connecting part may comprise a first electrical contact and the attachment part comprises a second electrical contact. The first and second electrical contacts may be for establishing an electrical connection between the connecting part and the attachment part when the first and second electrical contacts are in contact with one another. The input terminal may be electrically connected to the first contact. The output terminal may be electrically connected to the second contact. The input and output terminals may be electrically connected to one another via the connecting part and the attachment part, when the first and second electrical contacts are in contact with one another.

A shape of the second contact may correspond to the shape of a plug or socket forming the input terminal. The first contact may have a shape that is complementary to the shape of the second contact. For example, the shape of the first contact may correspond to the shape of a plug or socket connectable to the plug or socket shape of the second contact.

The first and/or second electrical contacts may extend along a length of the connecting part and/or attachment part respectively, such that the first electrical contact is in contact with the second electrical contact over at least a part of the travel of the connecting part relative to the attachment part, e.g. as the connecting part moves relative to the attachment part.

The assembly may comprise a charging cable extending from the connecting part or the attachment part, e.g. from the output terminal, for connecting to the electrical system of the vehicle. The cable may be configured to accommodate relative movement between the connecting part and the electrical system of the vehicle.

The connecting part may be pivotally coupled to the attachment part. In such arrangements, the first and second contacts may be omitted. Alternatively, the first and second electrical contacts may be provided at the pivot between the connecting part and the attachment part. For example, the first electrical contacts may be provided on a shaft or aperture of the pivot formed by the connecting part and the second electrical contacts may be provided on the other of the shaft or aperture of the pivot formed by the attachment part.

Additionally or alternatively, the connecting part may be slidably coupled to the attachment part. The attachment part may comprise a guide portion for guiding the connecting part along a path between the deployed and retracted positions. For example, the attachment part may comprise a hollow tube. The connecting part may be received within the interior of the hollow tube. A wall of the hollow tube may form the guide portion of the attachment part. The guide portion may be arcuate and may be for guiding the connecting part along an arcuate path.

The connecting part may comprise a protruding portion. The protruding portion may be arcuate. For example, the protruding portion of the connecting part may form a swan neck shape. The protruding portion of the connecting part may extend between the first electrical contact and the input terminal. The connecting part may be mountable on the vehicle such that the protruding portion extends from an underside of the body of the vehicle. The connecting part, e.g. the protruding portion, may extend upwardly from the underside of the vehicle body, e.g. to a position above a bottom of the vehicle body, when the connecting part is in the deployed position. Alternatively, the connecting part may be mountable on the vehicle such that the connecting part, e.g. the protruding portion, extends from a top side of the vehicle body. The connecting part, e.g. the protruding portion, may extend downwardly, e.g. from the top side of the vehicle body to a position below a top of the vehicle body, when the connecting part is in the deployed position. Additionally, the connecting part, e.g. the protruding portion, may extend outwardly from the vehicle body. For example, the connecting part, e.g. the protruding portion, may extend rearward from a rear of the vehicle body, forwards from a front of the vehicle body or sideways from a side of the vehicle body.

According to another aspect of the present disclosure, there is provided a charging assembly for a vehicle, wherein the charging assembly comprises a charging portion configured to be movable between a stowed position which is at least partially within the vehicle body and a deployed position which is at least partially outside of the vehicle body, wherein an electrical connection between the vehicle and the charging portion is only made when the charging portion is in one of the stowed position and the extended position.

According to another aspect of the present disclosure, there is provided a deployable charging point assembly for a vehicle, the assembly comprising a connecting part for connecting to a supply of electrical power separate from the vehicle, wherein the connecting part is movably mountable on the vehicle between a deployed position, in which at least a portion of the connecting part protrudes outwardly from a body of the vehicle, and a retracted position in which the connecting part protrudes less from the vehicle body, wherein the charging point assembly is configured to establish an electrical connection between the supply of electrical power and an electrical system of the vehicle.

A vehicle, e.g. an electric or plug-in hybrid motor vehicle, may comprise the above-mentioned deployable charging point assembly.

To avoid unnecessary duplication of effort and repetition of text in the specification, certain features are described in relation to only one or several aspects or embodiments. However, it is to be understood that, where it is technically possible, features described in relation to any aspect or embodiment may also be used with any other aspect or embodiment.

BRIEF DESCRIPTION OF THE FIGURES

The various features and advantages of the disclosed examples will become apparent to those skilled in the art from the detailed description. The figures that accompany the detailed description can be briefly described as follows:

FIG. 2 is a schematic side view of the deployable charging point assembly, shown overlaid on the vehicle, in a retracted position, mounted at an alternative location on the vehicle;

DETAILED DESCRIPTION

This present disclosure relates to deployable charging point assemblies for electric or hybrid vehicles, such as motor vehicles (e.g. cars, vans, trucks, motorcycles etc.), industrial or agricultural vehicles (e.g. tractors, forklifts, bulldozers, excavators, etc.), marine vessels, aircraft or any other type of vehicle.

A charge socket associated with electric or hybrid vehicles can be covered by a flap for protecting the charge socket from weather and debris that may otherwise settle on the charge socket and inhibit the operation of the charge socket. Providing a flap in a prominent location on the bodywork of a vehicle may be undesirable. Furthermore, leaving the flap open during charging of the vehicle, makes the flap and charge socket susceptible to accidental or deliberate disturbance or damage from passing cars and pedestrians. Additionally, the charging cable protruding from the vehicle at the position of the socket on the vehicle may form an undesirable trip hazard.

Figure 1A:
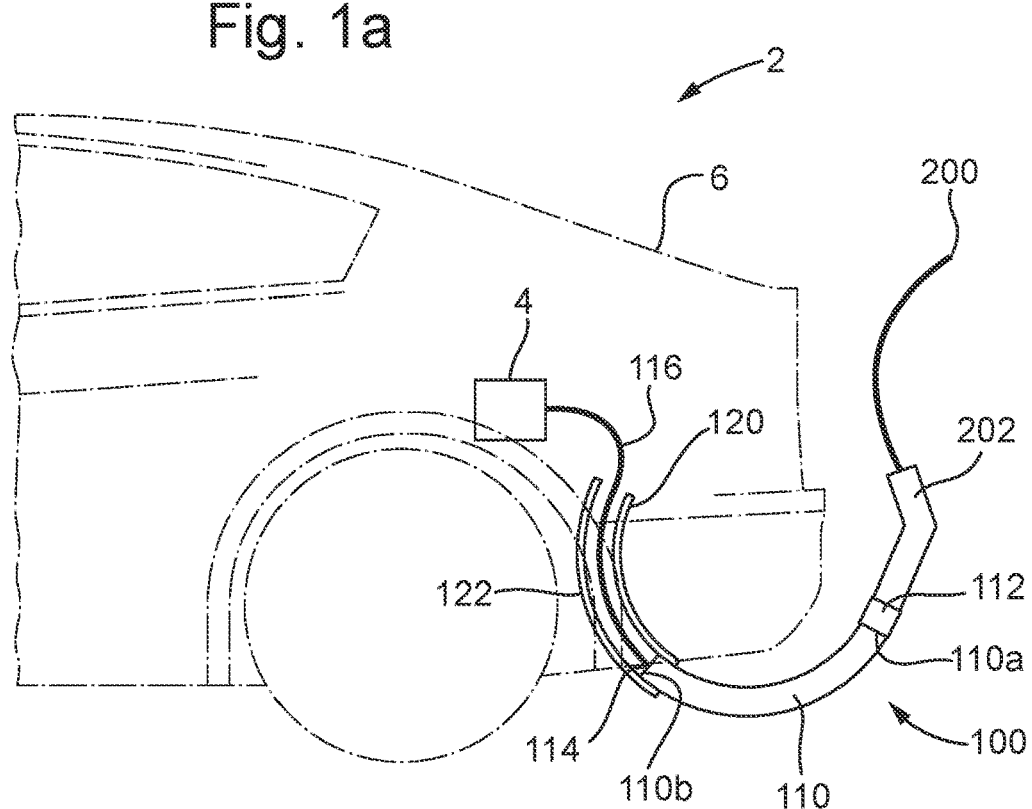
FIGS. 1a and 1b are schematic side views of a deployable charging point assembly for a vehicle, shown overlaid on the vehicle, with a connecting part of the charging point assembly in a deployed position and a retracted position respectively.
Figure 1B:
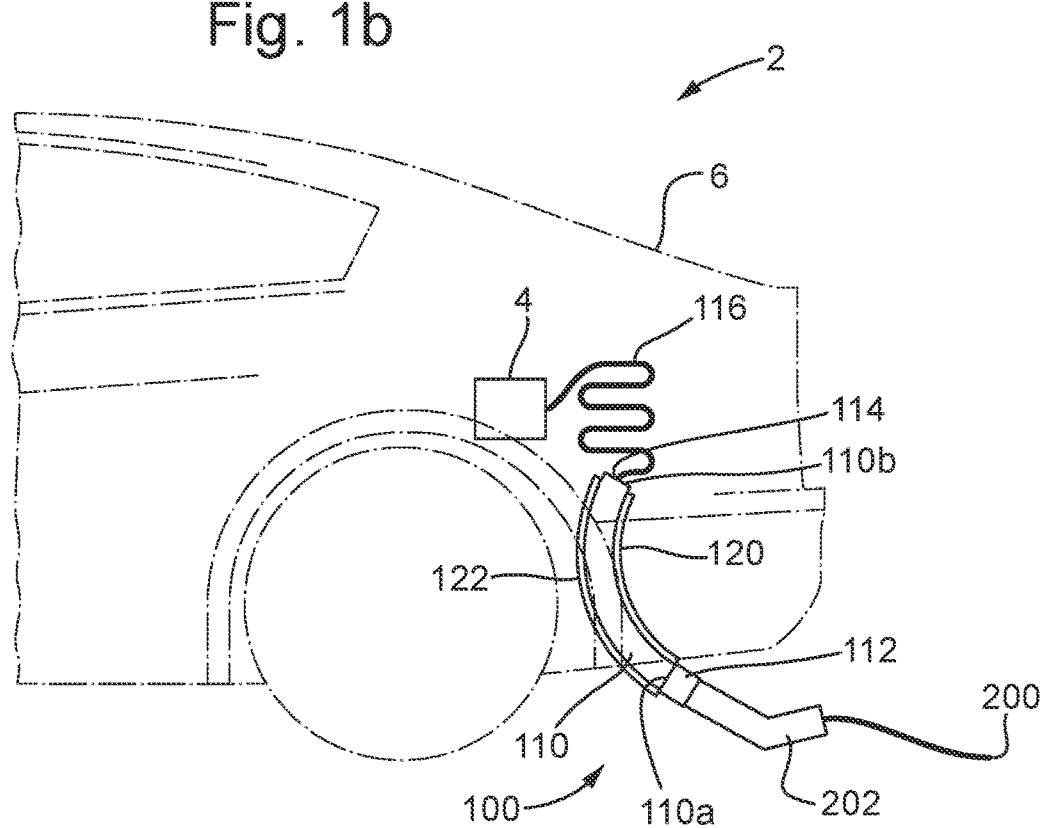

With reference to FIGS. 1a and 1b, a vehicle 2, such as an electric or plug-in hybrid motor vehicle, comprises an electrical system 4, including one or more batteries for storing energy for powering electrical drive motors of the vehicle, and a deployable charging point assembly 100 according to the present disclosure.

The deployable charging point assembly 100 comprises a connecting part 110. In the exemplary embodiment, the connecting part 110 is elongated and includes a first end 110a and a second end 110b. The connecting part 110 includes an input terminal 112 for connecting to a supply of electrical power supply 200 separate from the vehicle 2, e.g., connected to an electricity supply network. The input terminal 112 may comprise a plug or socket shaped to correspond to a plug or socket 202 provided on the electrical power supply 200. In other words, the input terminal 112 of the connecting part 110 may be connectable to the plug or socket 202 of the electrical power supply 200. The input terminal 112, e.g. the plug or socket, may be provided at the first end 110a of the connecting part 110.

The deployable charging point assembly 100 may further comprise an output terminal 114. The deployable charging point assembly 100 may be configured to electrically connect, e.g., selectively electrically connect, the output terminal 114 to the input terminal 112. In the arrangement shown in FIGS. 1a and 1b, the output terminal 114 is provided on the connecting part 110, e.g. at the second end 110b of the connecting part. However, in other arrangements, such as those described below, the output terminal 114 may be provided on another component of the deployable charging point assembly.

The deployable charging point assembly 100 further comprises one or more cables 116 extending from the output terminal 114 to the electrical system 4 of the vehicle 2, for electrically connecting the electrical system 4 the deployable charging point assembly. The electrical system 4 of the vehicle 2 may thereby be electrically connected to the electrical power supply 200.

The connecting part 110 may be movably, e.g. slidably and/or pivotally, mounted on the vehicle 2, e.g. on a body or frame 6 of the vehicle. The connecting part 110 may be movable between a deployed position, as depicted in FIG. 1a, in which the connecting part 110 at least partially protrudes outwardly from the body or frame 6 of the vehicle, e.g. relative to an outer surface of the body of the vehicle, and a retracted position, as depicted in FIG. 1b, in which the connecting part 110 protrudes less from the vehicle body. In the retracted position, the connecting part 110 may be substantially completely received within or beneath the vehicle body or frame 6. In other words, the connecting part 110 may be recessed relative to the outer surface of the vehicle body or frame 6 in the retracted position.

In other arrangements, the connecting part 110 may be received within or beneath the vehicle body, e.g. recessed relative to an outer surface of the vehicle body, when in the deployed position. In such arrangements, the connecting part 110 may be less deeply recessed relative to the outer surface of the vehicle body when in the deployed position compared to when in the retracted position.

The connecting part 110 may be movable relative to a body of the vehicle in an outward, upward and/or downward direction between the retracted and deployed positions.

As depicted, the cable 116 can be made sufficiently long and flexible to accommodate movement of the output terminal 114 as the connecting part 110 moves relative to the vehicle frame or body. In particular, the cable 116 may remain connected to the output terminal 114 and the vehicle electrical system 4 as the connecting part 110 moves.

The deployable charging point assembly 100 may comprise an attachment part 120. The attachment part 120 may be coupled, e.g. fixedly coupled, to the vehicle, e.g. to the body or frame 6 of the vehicle. The connecting part 110 may be movably coupled to the vehicle by the attachment part 120.

The attachment part 120 may comprise a guide portion 122 for guiding movement of the connecting part 110. For example, a surface of the connecting part 110 may slide along the guide portion 122 as the connecting part 110 moves relative to the attachment part 120.

The attachment part 120 may be tube shaped. For example, the attachment part 120 may comprise a circular tube. Alternatively, the attachment part 120 may comprise a tube having any other cross-sectional shape, such as oval, square, rectangular or any other shape. The connecting part 110 may be slidably received within the hollow interior of the tube-shaped attachment part 120. The shape of at least a portion of the connecting part 110 may correspond to the shape of the hollow interior of the attachment part 120. Walls of the tube may form the guide portion 122 of the attachment part 120.

At least part of the guide portion 122 may be arcuate. In this way, the attachment part 120 may guide the connecting part 110 to follow an arcuate path between the retracted and deployed positions. For example, at least a portion of a center line of the tube-shaped attachment part 120 may be arcuate. Additionally or alternatively, the connecting part 110 may be arcuate in shape or comprise an arcuate portion. The shape of the connecting part 110 or portion thereof may correspond to the shape of the arcuate guide portion of the attachment part 120. In the arrangements shown, the connecting part has a swan neck shape.

When the connecting part 110 is in the deployed position, the connecting part 110, e.g. the arcuate or sawn neck shaped portion of the connecting part 110 may extend from underneath the vehicle body, e.g. in outward and optionally upward directions relative to the vehicle body. In particular, the connecting part 110 may extend outwardly and upwardly such that the input terminal is arranged above a bottom of the vehicle body or frame 6 and is spaced from the vehicle body or frame in an outward direction relative to the body or frame. In this way, the input terminal may be ergonomically positioned for a user of the vehicle to couple the plug or socket 202 provided on the electrical power supply 200 to the input terminal 112.

In the arrangements shown in FIGS. 1a and 1b, the deployable charging point assembly 100 is mounted at the rear of the vehicle, e.g. closer to the rear of the vehicle than the front of the vehicle. In particular, the deployable charging point is positioned rearwards of a rear wheel of the vehicle. Further, the deployable charging point assembly 100 is mounted such that the connecting part 110 protrudes rearwards from the vehicle body when in the deployed position.

Alternatively, as depicted in FIG. 2 the deployable charging point assembly 100 may be mounted at the front of the vehicle, e.g. closer to the front of the vehicle than the rear of the vehicle. For example, the deployable charging point assembly 100 may be mounted forwards of a front wheel of the vehicle. The deployable charging point assembly 100 may be mounted such that the connecting part 110 protrudes forwards of the vehicle body in the deployed position.

Alternatively again, the deployable charging point assembly 100 may be mounted at any other location on the vehicle and/or may be arranged such that the connecting part 110 protrudes sideways from the vehicle body or frame 6 in the deployed position.

In the arrangement shown in FIGS. 1a, 1b and 2, the deployable charging point assembly 100 is configured to establish an electrical connection between the electrical power supply 200 and the vehicle electrical system 4 when the connecting part 110 is at any position between the deployed and retracted positions. In other words, the deployable charging point assembly 100 is configured to electrically connect the input terminal 112 to the output terminal 114 when the connecting part is at any position relative to the vehicle body.

However, in other arrangements the deployable charging point assembly 100 may be configured such that the output terminal 114 is electrically connected to the input terminal 112 when the connecting part 110 in at one or more predetermined positions relative to the attachment part 120, e.g. relative to the vehicle body.

For example, the deployable charging point assembly 100 may be configured such that the output terminal is electrically connected to the input terminal when the connecting part is in the retracted position, when the connecting part is in the deployed position and/or when the connecting part is in one or more intermediate positions, e.g. discrete positions or ranges of position, between the deployed and retracted positions.

Figure 3A:
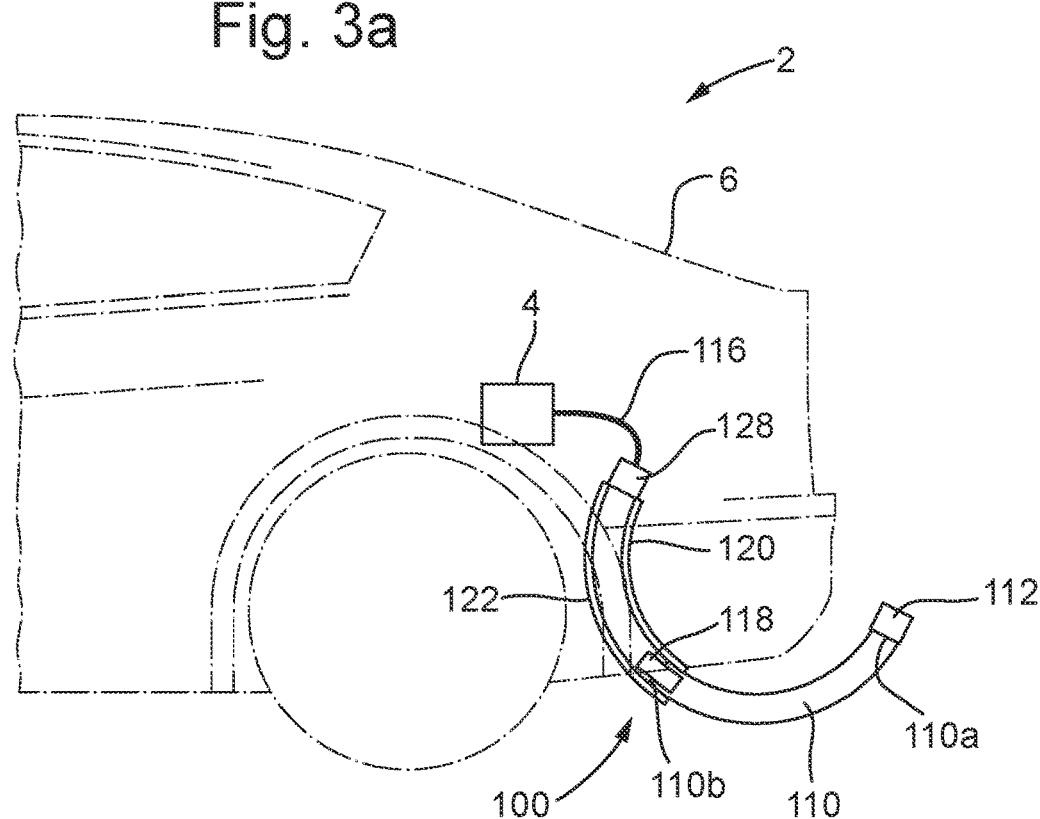
FIGS. 3a and 3b are schematic side views of another deployable charging point assembly for a vehicle, shown overlaid on the vehicle, with a connecting part of the charging point assembly in a deployed position and a retracted position respectively.
Figure 3B:
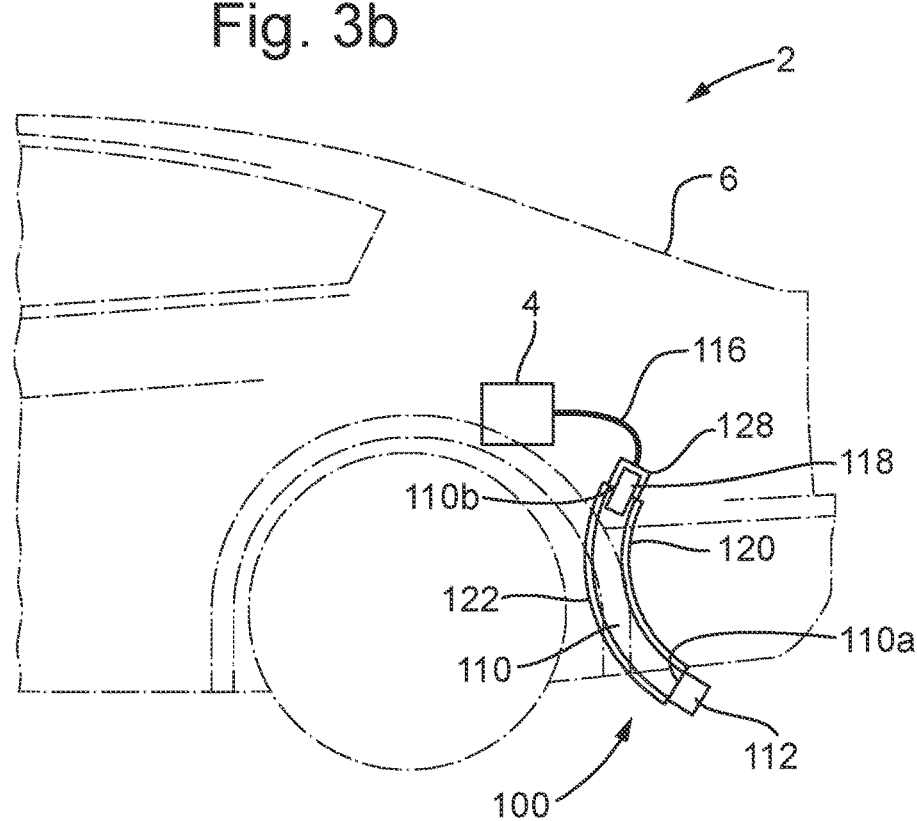

With reference to FIGS. 3a and 3b, the connecting part 110 may comprise one or more first electrical contacts 118 and the attachment part 120 may comprise one or more second electrical contacts 128. The first and second electrical contacts 118, 128 may be configured to establish an electrical connection between the connecting part 110 and the attachment part 120 when the first and second electrical contacts are in contact with one another.

As depicted in FIGS. 3a and 3b, the output terminal 114 may be provided on the attachment part 120. The input terminal 112 may be electrically connected to the first electrical contacts 118 and the output terminal 114 may be electrically connected to the second electrical contacts 128. The deployable charging point assembly 100 is thereby configured such that the vehicle electrical system 4 is electrically connected to the electrical power supply when the first and second contacts 118, 128 are in contact with one another.

As shown in FIGS. 3a and 3b, the first contact 118 may be provided at the second end 110b of the connecting part. The second contacts 128 may be arranged at one or more positions and/or along one or more lengths of the attachment part, e.g. the guide portion of the attachment part. For example, the second contacts 128 may be arranged at a position on the attachment part, e.g. at an end of the attachment part, such that the first contacts 118 contact the second contacts when the connecting part 110 is in the retracted position. Accordingly, the electrical system 4 may be electrically connected to the input terminal 112, and hence the electrical power supply 200, when the connecting part 110 is in the retracted position.

A shape of the first electrical contact 118 may correspond to the shape of the plug or socket 202 provided by the electrical power supply 200. In such arrangements, the second electrical contact 128 may be shaped as a complementary plug or socket, e.g. similar to the input terminal 112, so that the first electrical contact 118 can contact the second electrical contact 128.

Figure 4A:
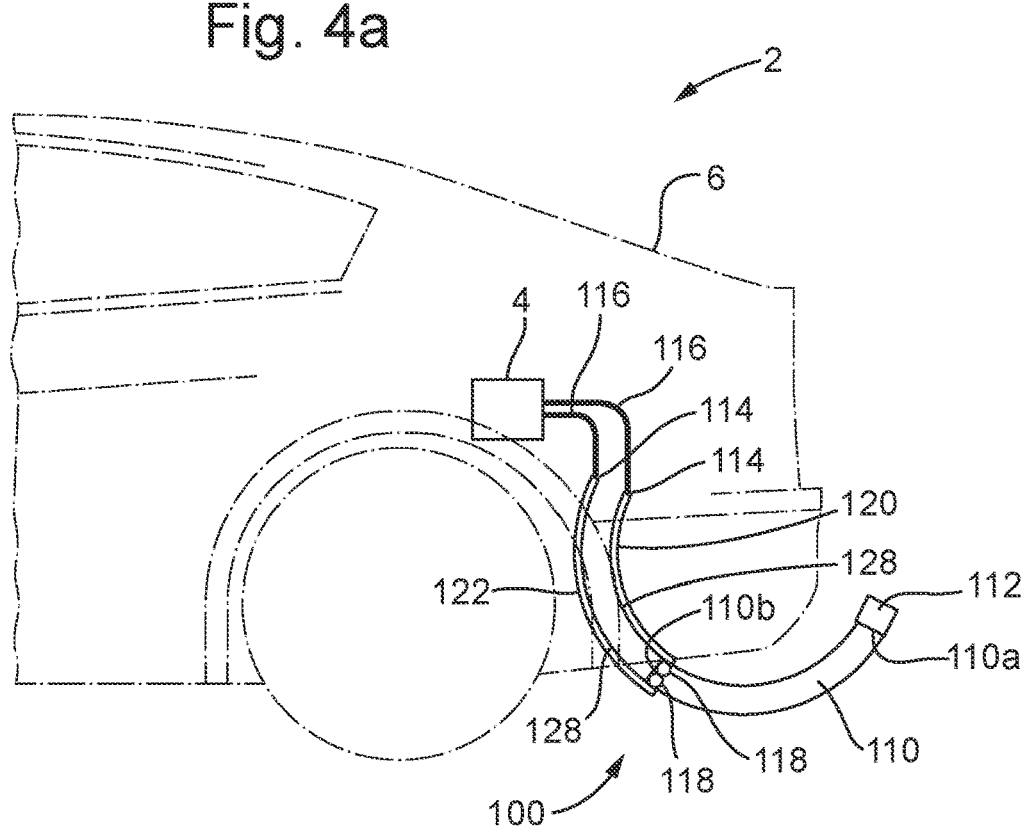
FIGS. 4a and 4b are schematic side views of another deployable charging point assembly for a vehicle, shown overlaid on the vehicle, with a connecting part of the charging point assembly in a deployed position and a retracted position respectively.
Figure 4B:
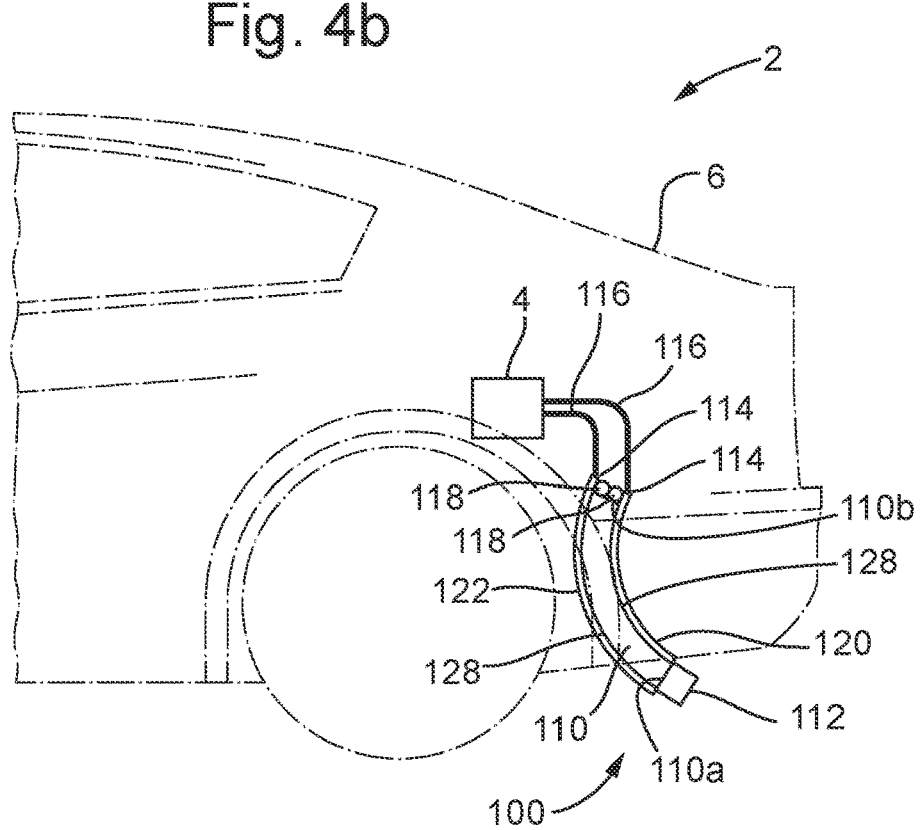

With reference to FIGS. 4a and 4b, in other arrangements the second electrical contacts 128 may be provided along one or more lengths of the attachment part 120. For example, the second electrical contacts 128 may be formed by or provided on the guide portion 122 of the attachment part 120. The first electrical contacts 118 may be configured to contact the second electrical contacts 128, e.g. respective ones of the second electrical contacts, along their lengths. In particular, the first electrical contacts may contact the second electrical contacts 128 when the first electrical contacts 118 are aligned with a position on the attachment part 120 at which the second electrical contacts 128 are provided.

In the arrangement shown in FIGS. 4a and 4b, the second electrical contacts 128 are provided along substantially the complete length of the attachment part 120, e.g. the guide portion 122 of the attachment part 120. However, in other arrangements the second electrical contacts may extend along a portion of length of the attachment part 120 or guide portion 122.

Further, in the arrangement shown in FIGS. 4a and 4b, the first electrical contacts 118 are provided at a substantially discreet position on, e.g. along the length of, the connecting part 110. However, in other arrangements, the first electrical contacts 118 may be provided along a length of the connecting part 110.

In the arrangements shown in FIGS. 1 to 4b, the connecting part 110 is slidably coupled to the attachment part 120. However, in other arrangements the connecting part 110 may, additionally or alternatively, be pivotally coupled to the attachment part 120.

Figure 5A:
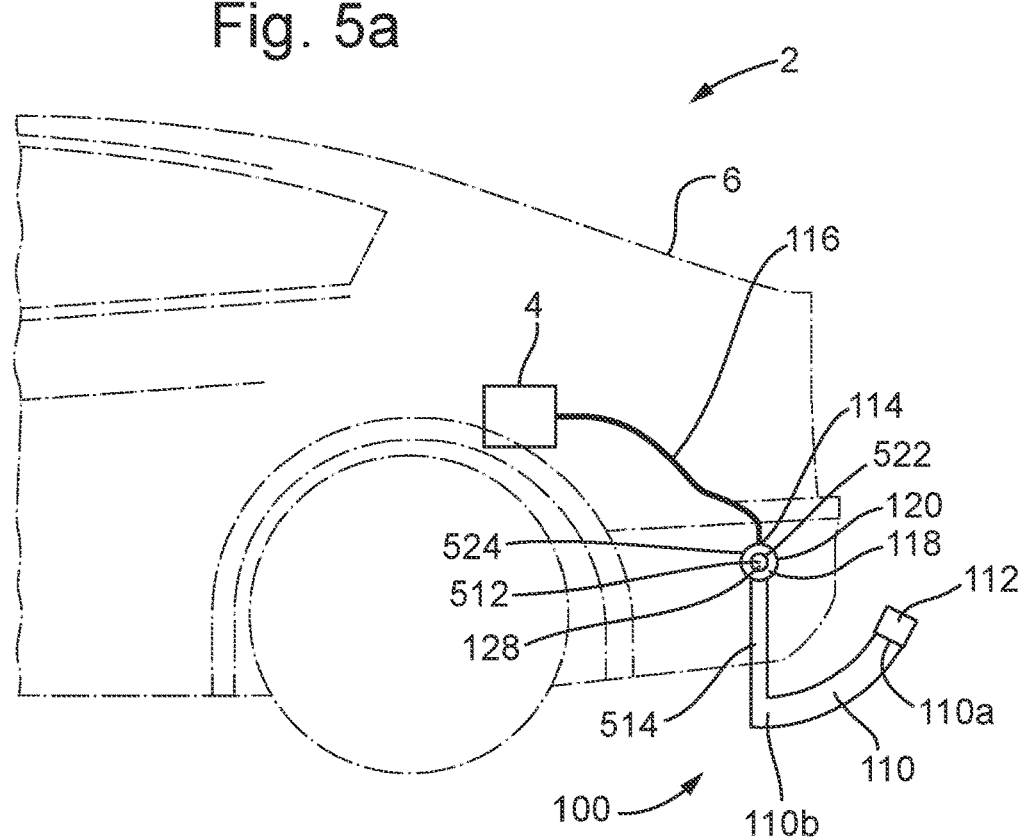
FIGS. 5a and 5b are schematic side views of another deployable charging point assembly for a vehicle, shown overlaid on the vehicle, with a connecting part of the charging point assembly in a deployed position and a retracted position respectively.
Figure 5B:
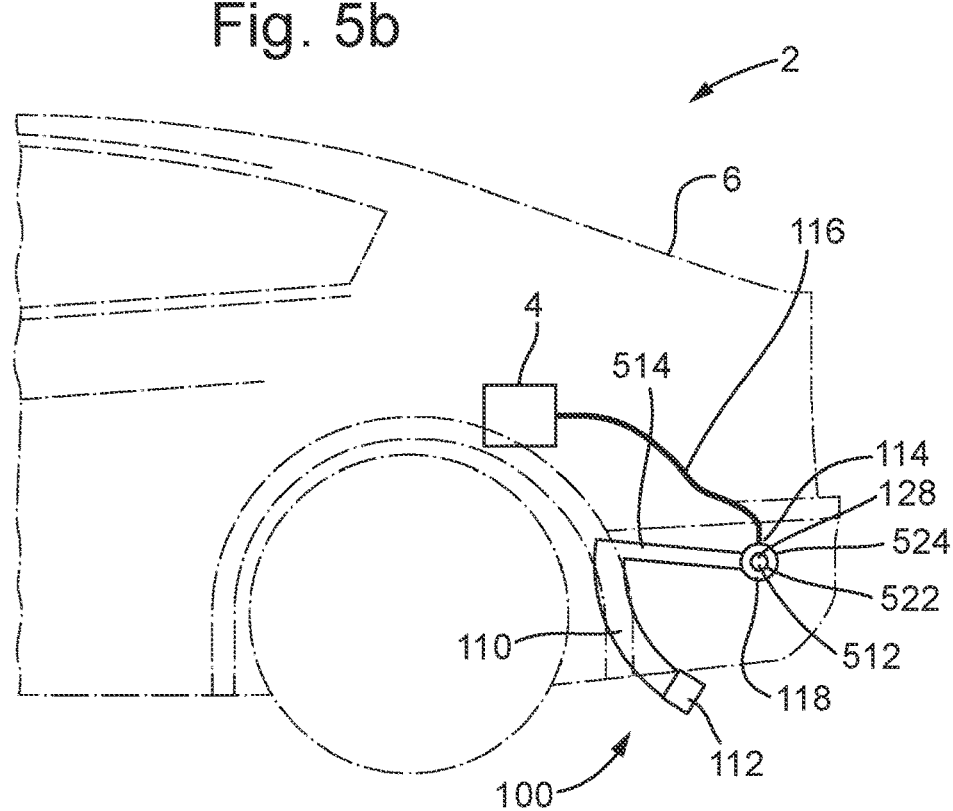

With reference to FIGS. 5a and 5b, the connecting part 110 may be pivotally coupled to the attachment part 120 at a pivot axis A1. For example, the connecting part 110 may comprise a shaft portion 512 extending through an aperture 522 formed in the attachment part 120. The attachment part 120 may form a bearing portion 524 extending around the aperture 522 for supporting rotations of the connecting part 110 about the pivot axis A1. In other arrangements, a shaft portion may be formed by the attachment part and an aperture for receiving the shaft portion may be formed by the connecting part.

As depicted, the connecting part 110 may comprise a lever portion 514 connecting the shaft portion 512 with the arcuate or swan neck shaped portion of the connecting part 110 on which the input terminal 112 is provided, e.g. at the first end 110a of the connecting part 110.

In the arrangements depicted in FIGS. 5a and 5b, the output terminal 114 is provided on the attachment part 120. The first electrical contact 118 may be provided on the shaft portion 512 of the connecting part and the second electrical contact 128 may be provided on the bearing portion 524 of the attachment part 120. The first and second electrical contacts 118, 128 may be configured such that the first and second electrical contacts are in contact with one another when the connecting part 110 and attachment part 120 are at one or more pivot angles relative to one another, which correspond to one or more positions of the connecting part at or between the deployed and retracted positions. For example, the first and second electrical contacts 118, 128 may be configured, e.g. shaped, such that the first and second electrical contacts are in contact with one another when the connecting part 110 is at an angle relative to the attachment part 120 corresponding to the retracted and/or deployed position of the connecting part 110.

Additionally or alternatively, the first and/or second contacts 118, 128 may extend about the shaft portion 512 and/or bearing portion 524 through an angle about the pivot axis A1, such that the first and second contacts 118, 128 are in contact with one another when the connecting part 110 is arranged at a range of angles relative to the attachment part 120, e.g. corresponding to a range of positions of the connecting part 110 between the deployed and retracted positions.

Figure 6A:
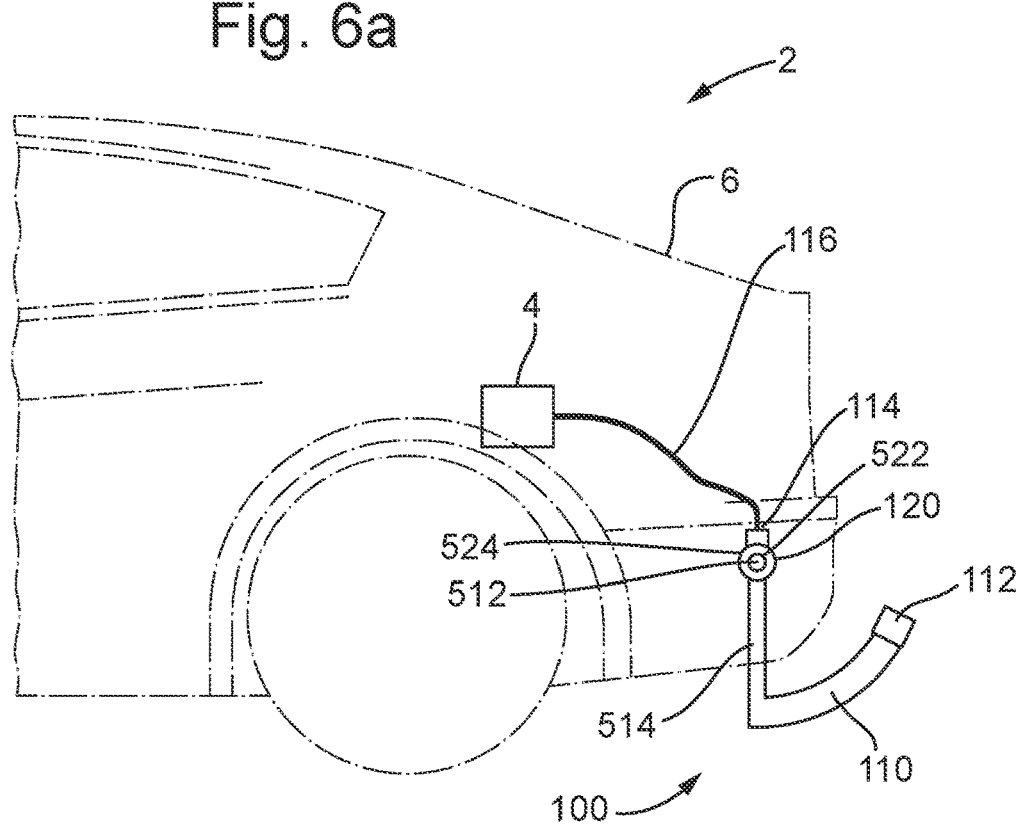
FIGS. 6a and 6b are schematic side views of another deployable charging point assembly for a vehicle, shown overlaid on the vehicle, with a connecting part of the charging point assembly in a deployed position and a retracted position respectively.
Figure 6B:
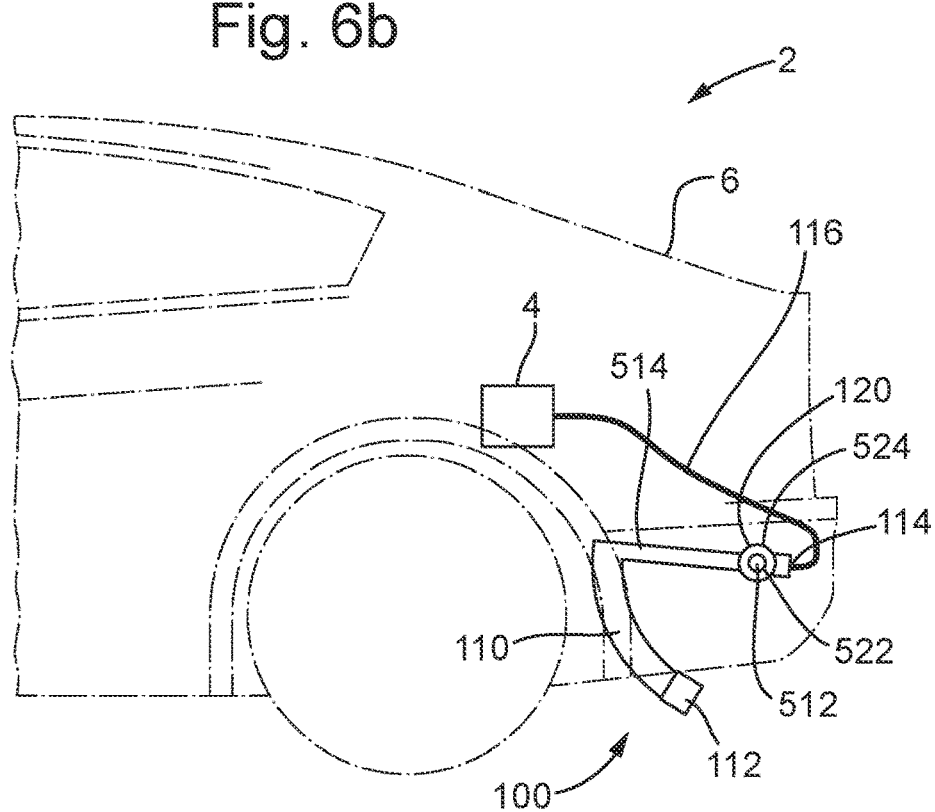
Figure 6C:
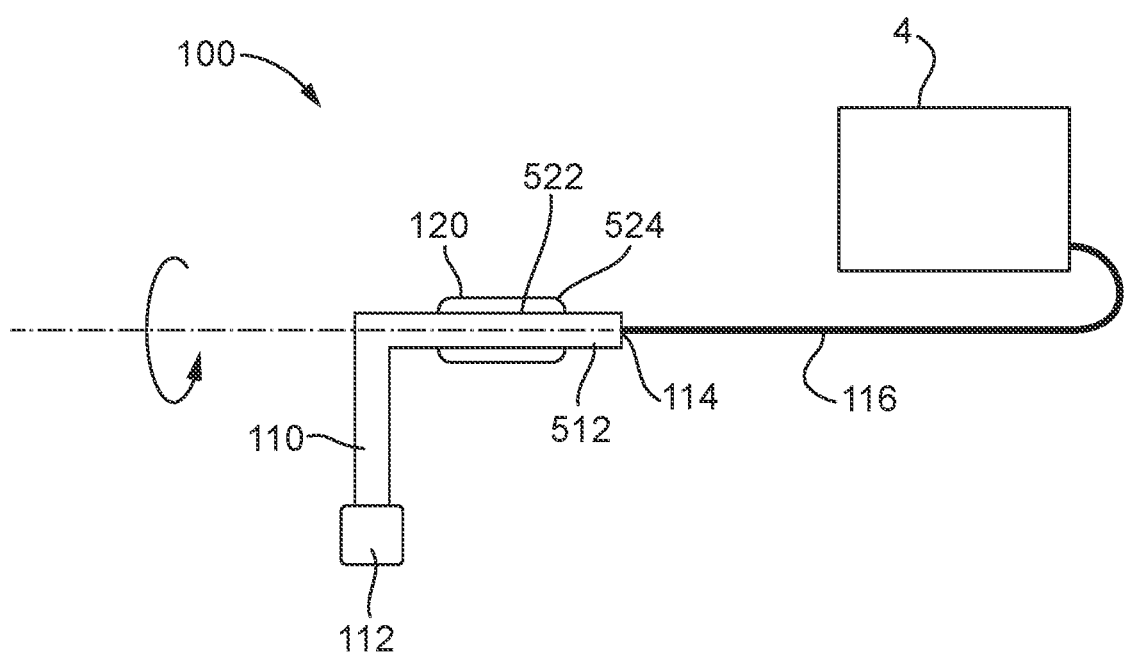
FIG. 6c is a schematic rear view of the deployable charging point assembly shown in FIGS. 6a and 6b in the retracted position.

With reference to FIGS. 6*a*, 6*b* and 6*c*, in other arrangements, the output terminal 114 may be provided on the connecting part 110. For example, the output terminal 114 may be provided on the shaft portion 512, e.g. part of the shaft portion 512 not received within the opening or aperture 522, or the lever portion 514. In some arrangements, the output terminal 114 may be formed on the shaft portion 512 on an opposite side of the bearing 524 from the lever portion 514. The cable 16 for connecting the output terminal 114 to the vehicle electrical system 4 may be configured to accommodate twisting of the cable 16 as the connecting part 110, and hence the output terminal 114, rotates relative to the vehicle body or frame 6.

The following additional, statements form part of the present disclosure:

A deployable charging point assembly for a vehicle according to an exemplary aspect of this disclosure includes, among other things, a connecting part for connecting to a supply of electrical power separate from the vehicle. The connecting part is mountable on the vehicle, such that the connecting part is movable relative to a body of the vehicle between a first position and a second position. The charging point assembly is configured to establish an electrical connection between the supply of electrical power and an electrical system of the vehicle when the connecting part is in one or more predetermined positions between the first and second positions.

In another exemplary embodiment of the foregoing assembly, the first position is a retracted position, in which the connecting part is recessed relative to an outer surface of the body of the vehicle, and the second position is a deployed position in which the connecting part is recessed less relative to the outer surface of the vehicle body.

In another exemplary embodiment of any of the foregoing assemblies, the charging point assembly is configured to establish the electrical connection between the supply of electrical power and the vehicle electrical system when the connecting part is in either the deployed position or the retracted position.

In another exemplary embodiment of any of the foregoing assemblies, the charging point assembly is configured to establish the electrical connection between the supply of electrical power and the vehicle when the charge point is in the retracted position.

In another exemplary embodiment of any of the foregoing assemblies, the assembly comprises an attachment part fixedly mountable on the vehicle. The connecting part is movably mountable on the vehicle by the attachment part.

In another exemplary embodiment of any of the foregoing assemblies, the connecting part comprises an input terminal for electrically connecting to the supply of electrical power. The attachment part comprises an output terminal connectable to the electrical system of the vehicle.

In another exemplary embodiment of any of the foregoing assemblies, the charging point assembly is configured such that the input terminal is electrically connected to the output terminal when the connecting part is in one or more predetermined positions relative to the attachment part.

In another exemplary embodiment of any of the foregoing assemblies, the connecting part includes a first electrical contact and the attachment part comprises a second electrical contact. The first and second electrical contacts being for establishing an electrical connection between the connecting part and the attachment part when the first and second electric contactors are in contact with one another.

In another exemplary embodiment of any of the foregoing assemblies, a shape of the second contact corresponds to the shape of a plug or socket forming the input terminal. The first contact has a shape that is complementary to the shape of the second contact.

In another exemplary embodiment of any of the foregoing assemblies, the first and/or second electrical contacts extend along a length of the connecting part and/or attachment part respectively, such that the first electrical contact is in contact with the second electrical contact over at least a part of the travel of the connecting part relative to the attachment part.

In another exemplary embodiment of any of the foregoing assemblies, the connecting part is pivotally coupled to the attachment part.

In another exemplary embodiment of any of the foregoing assemblies, the first and second electrical contacts are provided at the pivot between the connecting part and the attachment part.

In another exemplary embodiment of any of the foregoing assemblies, the assembly further comprises a charging cable extending from the connecting part for connecting to the electrical system of the vehicle, wherein the cable is configured to accommodate relative movement between the connecting part and the electrical system of the vehicle.

In another exemplary embodiment of any of the foregoing assemblies, the connecting part is slidably coupled to the attachment part.

In another exemplary embodiment of any of the foregoing assemblies, the attachment part comprises a guide portion for guiding the connecting part along a path between the deployed and retracted positions.

In another exemplary embodiment of any of the foregoing assemblies, the attachment part comprises a hollow tube. The connecting part is received within the interior of the hollow tube.

In another exemplary embodiment of any of the foregoing assemblies, the connecting part comprises a protruding portion. The connecting part is mountable on the vehicle such that the protruding portion extends from an underside of the body of the vehicle to a position above a bottom of the vehicle body, or from a top side of the vehicle body to a position below a top of the vehicle body, when the connecting part is in the deployed position.

In another exemplary embodiment of any of the foregoing assemblies, a vehicle includes the deployable charging point assembly of any of the preceding statements.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A deployable charging point assembly for a vehicle, comprising:

a connecting part of a charging point assembly, the connecting part configured to connect to a supply of electrical power separate from a vehicle, wherein the connecting part is mountable on the vehicle such that the connecting part is movable relative to a body of the vehicle between a first position and a second position, wherein the first position is a retracted position in which the connecting part is recessed relative to an outer surface of a body of the vehicle, and the second position is a deployed position in which the connecting part is recessed less relative to the outer surface of the vehicle body, the connecting part at least partially received within the vehicle when the connecting part is in the first position and when the connecting part the second position, wherein the charging point assembly is configured to establish an electrical connection between the supply of electrical power and an electrical system of the vehicle when the connecting part is in one or more predetermined positions.

2. The deployable charging point assembly of claim 1, wherein the charging point assembly is configured to establish the electrical connection between the supply of electrical power and the vehicle electrical system when the connecting part is in either the deployed position or the retracted position.

3. The deployable charging point assembly of claim 1, wherein the charging point assembly comprises an attachment part fixedly mountable on the vehicle, wherein the connecting part is movably mountable on the vehicle by the attachment part such that the connecting part is configured to move relative to the attachment part and the vehicle.

4. The deployable charging point assembly of claim 3, wherein the connecting part comprises an input terminal for electrically connecting to the supply of electrical power, and wherein the attachment part comprises an output terminal connectable to the electrical system of the vehicle.

5. The deployable charging point assembly of claim 4, wherein the charging point assembly is configured such that the input terminal is electrically connected to the output terminal when the connecting part is in one or more predetermined positions relative to the attachment part.

6. The deployable charging point assembly of claim 3, wherein the connecting part comprises a first electrical contact and the attachment part comprises a second electrical contact, the first and second electrical contacts establishing an electrical connection between the connecting part and the attachment part when the first and second electrical contacts are in contact with one another.

7. The deployable charging point assembly of claim 6, wherein the first electrical contact, the second electrical contact, or both the first and second electrical contacts extend along a length of the connecting part, the attachment part, or both, such that the first electrical contact is in contact with the second electrical contact over at least a part of the travel of the connecting part relative to the attachment part.

8. The deployable charging point assembly of claim 3, wherein the connecting part is pivotally coupled to the attachment part, slideably coupled to the attachment part, or pivotally and slideably coupled to the attachment part.

9. The deployable charging point assembly of claim 8, wherein the connecting part comprises a first electrical contact and the attachment part comprises a second electrical contact, the first and second electrical contacts establishing an electrical connection between the connecting part and the attachment part when the first and second electric contacts are in contact with one another, wherein the first and second electrical contacts are provided at a pivot between the connecting part and the attachment part.

10. The deployable charging point assembly of claim 3, wherein the charging point assembly further comprises a charging cable extending from the connecting part for connecting to the electrical system of the vehicle, wherein the cable is configured to accommodate relative movement between the connecting part and the electrical system of the vehicle.

11. The deployable charging point assembly of claim 8, wherein the attachment part comprises a guide portion for guiding the connecting part along a path between the deployed and retracted positions.

12. The deployable charging point assembly of claim 8, wherein the attachment part comprises a arcuate hollow tube, wherein the connecting part is received within the interior of the hollow tube when in the first position and when in the second position, wherein the connecting part moves along an arcuate path when transitioning between first position and the second position.

13. The deployable charging point assembly of claim 1, wherein the connecting part comprises a protruding portion, wherein the connecting part is mountable on the vehicle such that the protruding portion extends from an underside of the body of the vehicle to a position above a bottom of the vehicle body, or from a top side of the vehicle body to a position below a top of the vehicle body, when the connecting part is in the deployed position.

14. A vehicle comprising the deployable charging point assembly of claim 1.

15. A deployable charging point assembly for a vehicle, comprising:

a connecting part of a charging point assembly, the connecting part configured to connect to a supply of electrical power separate from a vehicle, the connecting part having a lever portion, wherein the connecting part is pivotably coupled to the vehicle such that the connecting part is pivotably relative to a body of the vehicle between a deployed position and a retracted position, wherein the charging point assembly is configured to establish an electrical connection between the supply of electrical power and an electrical system of the vehicle when the connecting part is in one or more predetermined positions.

16. The deployable charging point assembly of claim 15, wherein the charging point assembly is configured to establish the electrical connection between the supply of electrical power and the vehicle electrical system when the connecting part is in either the deployed position or the retracted position.

* * * * *